United States Patent [19]

Fujiie

[11] Patent Number: 4,539,667
[45] Date of Patent: Sep. 3, 1985

[54] DISC PLAYERS

[75] Inventor: Kazuhiko Fujiie, Tokyo, Japan

[73] Assignee: Sony Corporation, Tokyo, Japan

[21] Appl. No.: 439,585

[22] Filed: Nov. 5, 1982

[30] Foreign Application Priority Data

Nov. 10, 1981 [JP] Japan .............................. 56-180172

[51] Int. Cl.³ ............................................. G11B 19/24
[52] U.S. Cl. ....................................... 369/50; 369/59;
369/133; 369/240; 358/342
[58] Field of Search ................... 369/50, 59, 53, 13.3,
369/240; 358/342

[56] References Cited
U.S. PATENT DOCUMENTS 3,662,353  5/1972  Chertok ................................ 369/59
4,223,349  9/1980  Dakin et al. .......................... 369/50
4,338,683  7/1982  Furukawa et al. ................. 369/59 X Primary Examiner—Robert L. Richardson
Attorney, Agent, or Firm—Lewis H. Eslinger; Alvin Sinderbrand

[57] ABSTRACT

A disc player for reproducing an information signal from a rotating disc having a spiral track on which a digital signal is recorded with a waveform obtained by the run length limited code modulation comprises a control circuit system wherein an interval representing the maximum or minimum run length in a reproduced signal from the disc is utilized for controlling the rotation of a motor for rotating the disc so as to keep the tangential velocity of the spiral track relative to a pickup device constant at predetermined speed and an additional control circuit system for detecting an interval of a constant level in the reproduced signal exceeding in length the interval representing the maximum run length obtained at the proper rotation of the disc, which appears when the reproduced signal from the disc is not properly obtained and therefore the motor is in danger of running away that is, being driven beyond a maximum speed by an ever-increasing energization voltage, and, when such an interval is detected, preventing the motor from running away, for example, by stopping the motor from rotating.

6 Claims, 8 Drawing Figures

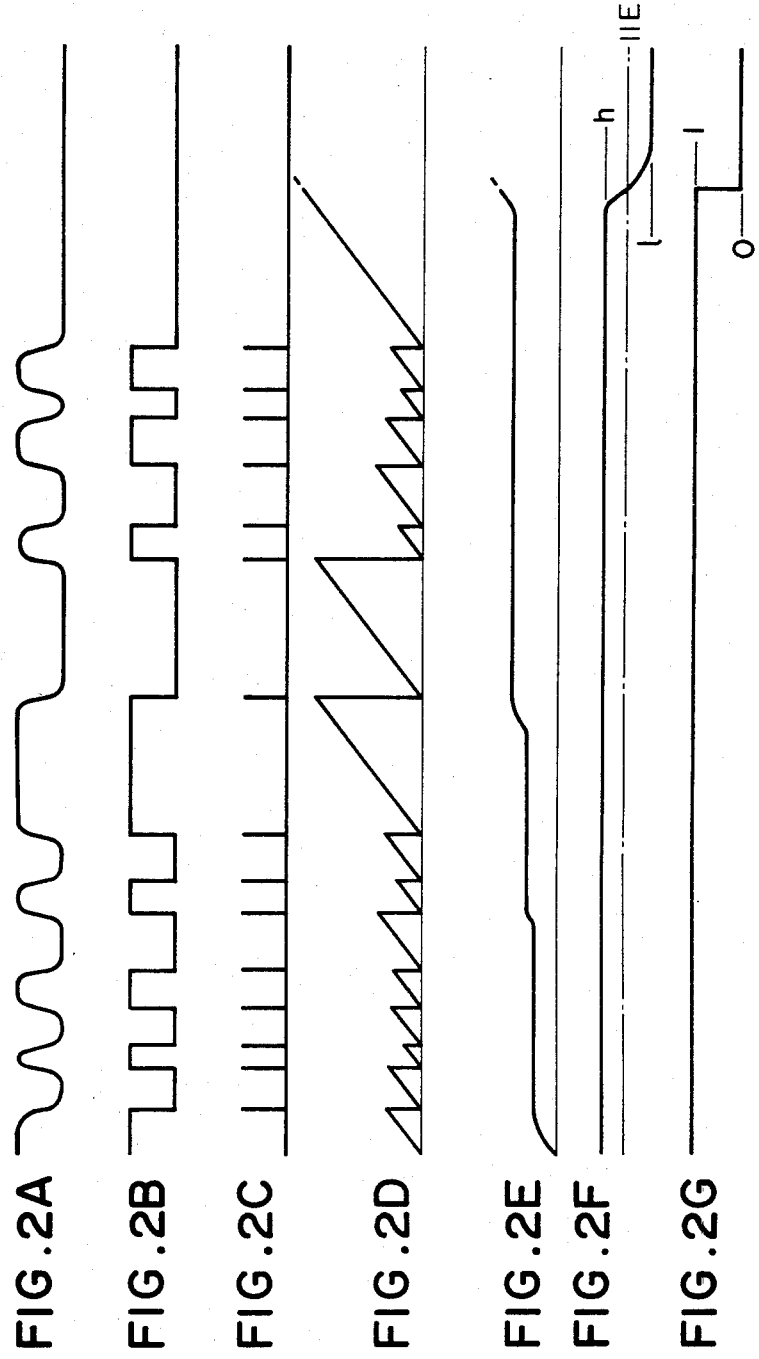

DISC PLAYERS

BACKGROUND OF THE INVENTION

This invention relates generally to apparatus for reproducing an information signal from a recorded disc rotated thereon, and more particularly, is directed to improvements in a disc player used for reproducing an information signal from a rotating disc having a spiral track on which such a digital signal as an audio PCM (pulse code modulation) signal is recorded with predetermined constant recording density.

In reproducing an information signal from a rotating disc having a spiral track on which a digital information signal containing a frame synchronous signal is recorded with constant recording density, it is required to keep the tangential velocity of the spiral track relative to a pickup device which reads the digital information signal from the spiral track (hereinafter referred to as scanning velocity) constant at predetermined speed whenever the pickup device is located on the spiral track between its innermost circle and its outermost circle provided on the disc. In order to keep the scanning velocity constant, the rotation of the disc is controlled in such a manner that, first the preliminary rotation control state is taken for controlling the rotation speed of the disc to vary in inverse proportion to the radius of a circle of the spiral track on which the pickup is really positioned so that the scanning velocity become almost constant at the predetermined speed, then when a reproduced digital information signal is obtained in the condition of frame synchronism, the phase comparison rotation control state in which the reproduced frame synchronous signal is compared in phase with a reference signal to produce a control signal for the rotation of the disc is taken for controlling the rotating speed of the disc to keep more accurately the scanning velocity constant at the predetermined speed.

As a manner of control during the preliminary rotation control state, it has been proposed that a potentiometer which generates an output varying in response to the position of the pickup device in the direction of the movement of the pickup device be provided for controlling the rotation speed of the disc in response to the output of the potentiometer. In this case, for example, a voltage which varies in inverse proportion with the radius of a circle of the spiral track from which the information signal is read out by the pickup device is produced in response to the output of the potentiometer. The voltage produced is supplied to a voltage controlled ocsillator, the output of which is compared in phase with an output of a frequency generator coupled directly with a motor for rotating the disc, to vary the output of the voltage controlled ocsillator in response to the output of the potentiometer, and the rotating speed of the motor for rotating the disc is controlled by the result of the comparison between the output of the voltage controlled oscillator and the output of the frequency generator so that the output of the frequency generator coincides in frequency and phase with the output of the voltage controlled ocsillator. As a result of this, the scanning velocity is set to be almost constant at the predetermined speed.

However, in this technique for controlling the scanning velocity to be almost constant at the predetermined speed with use of the potentiometer, there are several disadvantages. For example, a circuit performing the dividing operation, which is usually very expensive, is necessary for producing a voltage varying in inverse propotion with the output of the potentiometer. This kind of control system is unstable in the presence of variations in temperature and further the controlable range is restricted to be relatively narrow so that the stable control can not be performed in case the predetermined speed at which the scanning velocity is to be set is changed.

Accordingly, a different control technique described hereinafter has been also proposed for the preliminary rotation control state and used in practice in place of the above described control manner using the potentiometer and having the disadvantages mentioned above.

Generally, in the case of recording a PCM signal wherein the PCM signal is recorded in the form of a base band signal without carrier modulation such as amplitude modulation or frequency modulation, the run length limited code modulation is often adopted. The run length limited code modulation is a modulation system in which two different levels of the recording signal are provided in accordance with each binary data "0" and each binary data "1", respectively, and the minimum interval between two successive level transitions, which is called the minimum run length, Tmin, is made relatively long so that recording efficiency is increased and further the maximum interval between two successive level transitions, which is called the maximum run length, Tmax, is made relatively short so that self-clocking in the reproducing process is facilitated. In addition, since the maximum run length Tmax does not appear continuously in the normal modulated output, a specific pattern of waveform formed with a couple of successive intervals each corresponding to the maximum run length Tmax is added to the modulated output so as to be used as a frame synchronous signal. The maximum run length Tmax is arranged to be, for example, 5.5T (T is a cycle of binary digits of input binary data) and the minimum run length Tmin is arranged to be, for example, 1.5T.

As for previously proposed disc players used for reproducing an information signal from a disc on which a PCM signal is recorded with a waveform obtained by the run length limited code modulation wherein the maximum run length Tmax and the minimum run length Tmin are fixed appropriately, it has been proposed for the preliminary rotation control state that the maximum interval of a constant level between two successive level transitions in the reproduced signal from the disc is detected and compared in length with a reference interval corresponding to the maximum run length Tmax obtained in the condition wherein the disc is rotated with the correct scanning velocity, then in case that the detected maximum interval of a constant level is longer than the reference interval, a motor for rotating the disc is controlled to rotate at higher rotating speed so that the maximum interval of a constant level between two successive level transitions in the reproduced signal from the disc is reduced and, on the other hand, in case that the detected maximum interval of a constant level is shorter than the reference interval, the motor for rotating the disc is controlled to rotate at lower rotating speed so that the maximum interval of a constant level between two successive level transitions in the reproduced signal from the disc is increased, and as a result of this control, the rotating speed of the disc is so controlled that the scanning velocity becomes almost constant at predetermined speed.

Also proposed has been a control technique for the preliminary rotation control state wherein the minimum run length Tmin is utilized for controlling the scanning velocity to be constant. In this control manner, the minimum interval of a constant level between two successive level transitions in the reproduced signal from the disc is detected and compared in length with a reference interval corresponding to the minimum run length Tmin obtained in the condition wherein the disc is rotated with the correct scanning velocity, then in case that the detected minimum interval of a constant level is longer that the reference interval, the motor for rotating the disc is controlled to rotate at higher rotating speed and, on the other hand, in case that the detected minimum interval of a constant level is shorter that the reference interval, the motor for rotating the disc is controlled to rotate at lower rotating speed, so that the rotating speed of the disc is so controlled that the scanning velocity becomes constant at the predetermined speed.

With either control technique mentioned above, when the reproduced signal from the disc is obtained in the condition of frame synchronism due to the control in the preliminary rotation control state, the phase comparison rotation control state wherein a reproduced frame synchronous signal is utilized is taken to control the rotating speed of the disc to keep the scanning velocity constant at the predetermined speed more accurately.

However, in the phase comparison rotation control state, when a pickup device is positioned on a mirror surface, where no signal is recorded, provided at the peripheral portion of the disc for some reason or, in the case of an optical pickup device, defocusing of an optical stylus is caused, the reproduced frame synchronous signal is not obtained and therefore the phase comparison rotation control state can not be continued, so that the preliminary rotation control state is taken again automatically. In such a case, in case that the above mentioned control manner wherein the maximum interval or the minimum interval of a constant level between two successive level transitions in the reproduced signal from the disc is detected to control the scanning velocity to be almost constant at the predetermined speed is adopted for the preliminary rotation control state, since a very long interval of a constant level appears in the reproduced signal, such a control as to intend to shorten the interval of a constant level is performed and consequently the motor for rotating the disc is continuously controlled to increase its rotating speed. This results in the problem that the rotating speed of the motor becomes extremely high and the motor tends to run away.

OBJECTS AND SUMMARY OF THE INVENTION

Accordingly, it is an object of the present invention to provide an improved disc player for reproducing an information signal from a rotating disc on which a digital signal is recorded with a waveform obtained by the run length limited code modulation and which avoids the above described disadvantages and problem of the prior art.

Another object of the present invention is to provide an improved disc player for reproducing an information signal from a rotating disc having a spiral track on which a digital signal is recorded with a waveform obtained by the run length limited code modulation and which can control the scanning velocity, as aforementioned, to become constant at the predetermined speed without causing a motor for rotating the disc to run away even if the reproduced signal is not correctly obtained.

According to an aspect of the present invention, a disc player for reproducing an information signal from a rotating disc having a spiral track on which a digital signal is recorded with a waveform obtained by the run length limited code modulation, which is provided with a control circuit system wherein an interval representing the maximum or minimum run length, as aforementioned, in the reproduced signal from the disc is utilized to control the rotation of a motor for rotating the disc so as to keep the scanning velocity, that is the tangential velocity of the spiral track of the disc to a pickup device for reading the digital signal from the disc, constant at predetermined speed, is further provided with an additional control circuit system for detecting an interval of a constant level in the reproduced signal from the disc exceeding in length the interval representing the maximum run length obtained at the proper rotation of the disc, which appears when the reproduced signal from the disc is not correctly obtained and therefore the motor is in danger of running away, and, when such an interval is detected, preventing the motor from running away, for example, by stopping supply of a driving signal to the motor.

The above, and other objects, features and advantages of the present invention will become apparent from the following detailed description of preferred embodiment taken in conjunction with the accompanying drawings.

BRIEF DESCRIPTION OF THE DRAWINGS

FIGS. 2A to 2G are waveform charts used for explaining the operation of the essential part of the embodiment shown in FIG. 1.

DESCRIPTION OF THE PREFERRED EMBODIMENT

Figure 1:
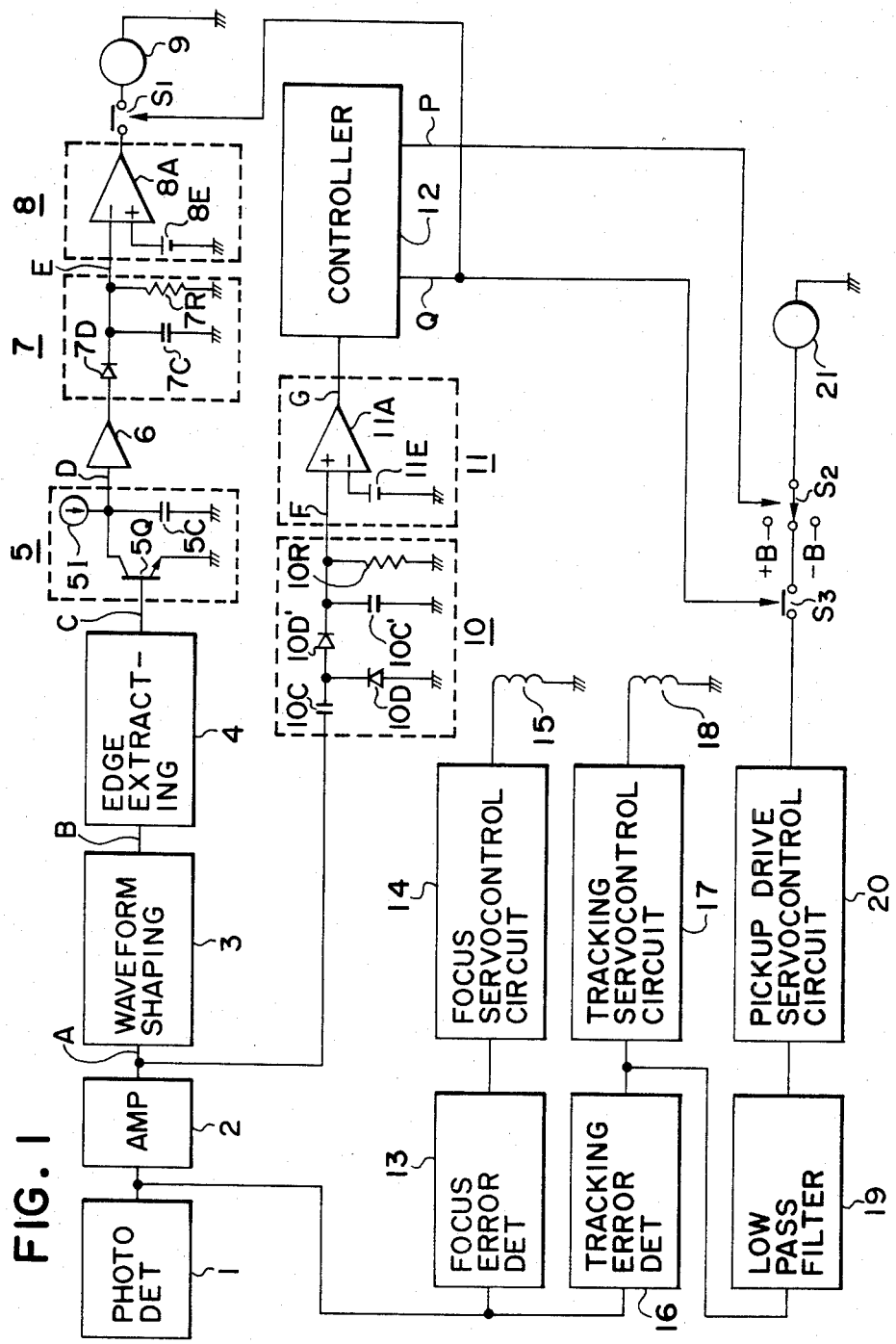
FIG. 1 is a block diagram showing an essential part of one embodiment of a disc player according to the present invention.

One embodiment of a disc player according to the present invention will be explained with reference to FIGS. 1 and 2A to 2G.

FIG. 1 shows an essential part of one embodiment of the disc player according to the present invention. In the embodiment, an optical pickup device for reading a signal recorded on a disc by an optical stylus of light beam is provided and the optical pickup device contains a photo detector 1 from which a reproduced signal from the disc is obtained. In this case, the disc has a spiral track on which a PCM signal is recorded with a waveform obtained by the run length limited code modulation wherein the maximum run length Tmax and the minimum run length Tmin, as aforesaid, are fixed appropriately and with constant recording density. The photo detector 1 is connected to an amplifier 2, the output end of which is connected to a waveform shaping circuit 3. The output end of the waveform shaping circuit 3 is connected to an edge extracting circuit 4 and the output end of the edge extracting circuit 4 is connected to an integrating circuit 5. The integrating circuit 5 consists of a transistor 5Q, a capacitor 5C and a constant current source 5I. The capacitor 5C is charged by the current from the constant current source 5I when the transistor 5Q is in the nonconductive state and the charge of the capacitor 5C is discharged throuth the transistor 5Q when the latter is in the conductive state.

The output end of the integrating circuit 5 is connected through a buffer circuit 6 to a peak holding circuit 7. The peak holding circuit 7 consists of a diode 7D, a capacitor 7C and a resistor 7R and the peak level of a signal supplied to the input end of the peak holding circuit 7 is held with the time constant determined by the capacitor 7C and the resistor 7R. The output end of the peak holding circuit 7 is connected to a comparing circuit 8. The input end of the comparing circuit 8 is connected to the comparing input terminal of a comparator 8A and a reference voltage source 8E is connected to the reference input terminal of the comparator 8A, so that a difference voltage between the voltage at the comparing input terminal and the reference voltage at the reference input terminal is derived from the output end of the comparing circuit 8. The reference voltage from the reference voltage source 8E is selected to coincide with the output voltage of the peak holding circuit 7 obtained in such a condition that the optical pickup device reads the PCM signal recorded on the disc with the correct scanning velocity. The output end of the comparing circuit 8 is connected to a motor 9 for rotating the disc through a swich $S_1$ explained in detail later.

With the above described configuration, a control circuit system for performing the rotation control for the motor 9 in the preliminary rotation control state is formed. Incidentally, a control circuit system for performing the rotation control for the motor 9 in the phase comparison control state, wherein a frame synchronous signal in the reproduced signal is utilized to produce a control signal for the motor 9, is omitted to be shown in FIG. 1 for simplification.

The output end of the amplifier 2 is also connected to an integrating circuit 10 for detecting the envelope level of the reproduced signal. The integrating circuit 10 is formed with a coupling capacitor 10C, diodes 10D and 10D', a capacitor 10C' for integration and a resistor 10R, and its output end is connected to a comparing circuit 11. The comparing circuit 11 consists of a comparator 11A and a reference voltage source 11E and makes comparison for judging whether the voltage at the input end exceeds the reference voltage from the reference voltage source 11E or not. The reference voltage from the reference voltage source 11E is selected to be lower than the output voltage of the integrating circuit 10 obtained in such a condition that each interval of a constant level between two successive level transitions in the reproduced signal does not exceed the interval representing the maximum run length Tmax. The output end of the comparing circuit 11 is connected to a controller 12.

From the controller 12, various control signals are sent out for controlling the optical pickup device to perform various different operations, for example, the normal reproducing operation, the hold operation by which the optical stylus of the optical pickup device is set to trace one circle of the spiral track repeatedly, the fast forwarding operation by which the optical stylus is moved in the direction of the radius of the disc to the peripheral portion from the central portion of the disc, the fast reversing operation by which the optical stylus is moved in the direction of the radius of the disc to the central portion from the peripheral portion of the disc, and so on. For example, a control signal P is sent out in order to make a switch $S_2$ select a contact coupled with a positive voltage source $+B$ to supply with the voltage from the positive voltage source $+B$ to a motor 21 for driving the optical pickup device so that the fast forwardly operation is performed or in order to make the swich $S_2$ select a contact coupled with an negative voltage source $-B$ to supply with the voltage from the negative voltage source $-B$ to the motor 21 so that the fast reversing operation is performed. Further, a control signal Q is sent out from the controller 12 in order to turn both the switch $S_1$ and a switch $S_3$ off to stop supplying the voltage to the motors 9 and 21 respectively, when the disc player comes into an abnormal condition.

The output end of the photo detector 1 is also connected through a focus error detecting circuit 13 to a focus servocontrol circuit 14 and a focus coil 15 is connected to the output end of the focus servocontrol circuit 14. The output end of the photo detector 1 is further connected through a tracking error detecting circuit 16 to a tracking servocontrol circuit 17 and a tracking coil 18 is connected to the output end of the tracking servocontrol circuit 18. The output end of the tracking error detecting circuit 16 is connected also to a low pass filter 19 which allows only a low frequency component of the tracking error signal to pass through. The output end of the low pass filter 19 is connected to a pickup drive servocontrol circuit 20, the output end of which is connected to the motor 21 through the switches $S_3$ and $S_2$ mentioned above.

Now, the operation of the essential part of the embodiment having the above described configuration will be explained hereinafter with reference to the waveforms shown in FIGS. 2A to 2G.

The reproduced signal obtained from the photo detector 1 is amplified to have an appropriate level by the amplifier 2 and appears at the output end of the amplifier 2 in the form of a signal A having the waveform shown in FIG. 2A. The signal A is reformed in waveform to a rectangular wave signal B having the waveform shown in FIG. 2B, the high and low levels of which corresponds to "1" and "0", respectively, by the waveform shaping circuit 3. The rectangular wave signal B is supplied to the edge extracting circuit 4 and a edge pulse train C shown in FIG. 2C is obtained in response to the rising edges and falling edges of the rectangular wave signal B at the output end of the edge extracting circuit 4. When each edge pulse in the edge pulse train is supplied to the base of the transistor 5Q of the integrating circuit 5, the transistor 5Q becomes conductive and therefore the charge of the capacitor 5C is discharged therethrough instantaneously, and on the other hand, in each period in which the edge pulse is not supplied to the base of the transistor 5Q, the transistor 5Q keeps nonconductive and therefore the capacitor 5C is charged by the current from the constant current source 5I to increase the voltage thereat. Accordingly, the output of the integrating circuit 5, that is, the voltage at one end of the capacitor 5C becomes a sawtooth wave voltage D having the sawtooth waveform as shown in FIG. 2D, each peak value of which is proportional to the interval between two successive edge pulses in the edge pulse train C, in other words, the interval of a constant level between two successive level transitions in the reproduced signal.

The sawtooth wave voltage D obtained in such a manner is supplied to the peak holding circuit 7 through the buffer circuit 6 and the peak holding operation for the sawtooth wave voltage D is conducted thereat. That is, the output of the buffer circuit 6 is supplied to the capacitor 7C and the resistor 7R through the diode 7D to be integrated with the time constant determined by the capacitor 7C and the resistor 7R and this time constant is selected to be tens times as long as a frame period in the reproduced signal, so that the peak value of the sawtooth wave voltage D is held to produce a voltage E having the waveform as shown in FIG. 2E at the output end of the peak holding circuit 7. In the reproduced signal, a frame synchronous signal formed with a couple of successive intervals each corresponding to the maximum run length Tmax, which is, for example, 5.5T, appears once a frame period and accordingly the voltage E from the peak holding circuit 7 takes normally the value corresponding to the interval representing the maximum run length Tmax in the reproduced signal. Then, the voltage E is compared with the reference voltage from the reference voltage source 8E at the comparing circuit 8.

In case that the scanning velocity is varied in reproduction of the signal from the spiral track of the disc, the interval representing the maximum run length Tmax in the reproduced signal is varied in length and consequently the voltage E from the peak holding circuit 7 is varied in level. The level variations in the voltage E resulting from the variations in the scanning velocity are caused in such a manner that the level on the voltage E increases when the scanning velocity is made lower and decreases when the scanning velocity is made higher, so the difference between the actual scanning velocity and the correct predetermined scanning velocity is to be detected by detecting the difference between the voltage E actually obtained from the peak holding circuit 7 and the reference voltage from the reference voltage source 8E which is selected to coincide with the output voltage of the peak holding circuit 7 obtained in the condition wherein reproduction of the signal from the disc is conducted with the correct scanning velocity and the interval representing the maximum run length Tmax in the reproduced signal becomes 5.5 T. This means that the output of the comparing circuit 8, wherein the voltage E from the peak holding circuit 7 is compared with the reference voltage from the reference voltage source 8E, indicates errors in the scanning velocity.

Accordingly, in the preliminary rotation control state, with the output of the comparing circuit 8, the rotation of the motor 9 for rotating the disc is controlled so that the interval representing the maximum run length Tmax in the reproduced signal from the disc becomes correct in its length and the correct scanning velocity is obtained. Further, when the reproduced signal from the disc comes to be obtained in the condition of frame synchronism and a phase comparing circuit provided for comparing in phase the frame synchronous signal in the reproduced signal with a reference signal comes to be operative as a result of the control as aforesaid in the preliminary rotating control state, the phase comparison rotation control state is taken for keeping the correct scanning velocity more accurately.

Incidentally, the operation of the switch $S_1$ provided between the output end of the comparing circuit 8 and the motor 9 will be explained later.

Although the rotation control for the motor 9 for rotating the disc is performed so as to keep the correct scanning velocity in the manner described above, in case that the optical pickup device on the disc is positioned on a portion having a mirror surface where no signal is recorded for some reason in the phase comparison rotation control state, the frame synchronous signal is not obtained in the reproduced signal and therefore the phase comparison rotation control state can not be continued and the preliminary rotation control state is taken again. In this case, any level transition is not caused in the reproduced signal and the edge pulse is not obtained from the edge extracting circuit 4, so that the discharging in the integrating circuit 5 is not caused and therefore the level of the sawtooth wave voltage D continues to increase. Consequently, the voltage E from the peak holding circuit 7 becomes abnormally high and the motor 9 for rotating the disc is controlled to increase continuously its rotating speed by the output of the comparing circuit 8 and is in danger of running away. Such a situation will be also caused in the condition wherein relatively long dropout in the reproduced signal occurs or defocusing of the optical stylus occurs in extreme.

In the embodiment, the motor 9 is prevented from running away by the operation of an additional control circuit system including the integrating circuit 10, the comparing circuit 11 and the controller 12 in the situation mentioned above.

In the additional control circuit system, the signal A obtained at the output end of the amplifier 2 in response to the reproduced signal from the photo detector 1 is supplied to the integrating circuit 10 which detects the envelope level of the signal A and an envelope detected output F having the level corresponding to the envelope level of the signal A as shown in FIG. 2F is obtained from the integrating circuit 10. The envelope detected output F is compared with the reference voltage having a level G shown in FIG. 2F from the reference voltage source 11E at the comparator 11A in the comparing circuit 11. An output H of the comparing circuit 11 takes a high level "1" when the envelope detected output F is equal to or higher that the level G and takes a low level "0" when the envelope detected output F is lower than the level G, as shown in FIG. 2G.

The envelope detected output F from the integrating circuit 10 takes a high level h, as shown in FIG. 2F, when the signal recorded on the spiral track of the disc is reproduced and therefore each interval of a constant level between two successive level transitions in the signal A does not exceed the interval representing the maximum run length Tmax and, to the contrary, takes a low level 1, as shown in FIG. 2F, when reproducing of the signal recorded on the spiral track of the disc is not conducted because of, for example, such a situation that the optical pickup device is positioned on the portion having the mirror surface and therefore an interval of a constant level exceeding the interval representing the maximum run length Tmax obtained at the proper rotation of the disc appears in the signal A. Further, the level of the reference voltage from the reference voltage sourde 11E is selected to be lower than the high level h of the envelop detected output F. Accordingly, the abnormal situation, wherein reproducing of the signal from the disc is not conducted because the optical pickup device is positioned on the portion having the mirror surface, for example, and therefore the motor 9 for rotating the disc is in danger of running away, is indicated by the level "0" of the output G of the comparing circuit 11, which is obtained when the level of the envelop detected output F becomes lower that the voltage of the reference source 11E.

The output G of the comparing circuit 11 is supplied to the controller 12. When the output G takes the high level "1", the controller 12 does not send out the control signal Q and the switches $S_1$ and $S_3$ are kept in the conductive state so that rotation control for both the motors 9 for rotating the disc and the motor 21 for driving the optical pickup divice is performed. On the other hand, when the output G takes the low level "0", the controller 12 sends out the control signal Q to turn the switches $S_1$ and $S_2$ off. Consequently, the motor 9 for rotating the disc is stopped rotating and the motor 21 for driving the optical pickup device is also stopped rotating, so that the motor 9 is prevented from running away.

In place of sending out the control signal Q, it is also possible for the controller 12 to send out another control signal P to make the switch $S_2$ select the contact coupled with the negative voltage source $-B$. In this case, the motor 21 for driving the optical pickup device is supplied with the voltage from the negative voltage source $-B$ and the fast reversing operation is performed so as to return the optical pickup device to its initial position for reading the signal from the disc, then the optical pickup device starts to read the signal from the disc again and the signal A is normally obtained. Accordingly, the output H of the comparing circuit 11 takes the high level "1" again and the motor 9 for rotating the disc is prevented from running away.

Furthermore, the reproduced signal from the photo detector 1 is also supplied to both of the focus error detecting circuit 13 and the tracking error detecting circuit 16, and a focus error signal and a tracking error signal are obtained from the focus error detecting circuit 13 and the tracking error detecting circuit 16, respectively. The focus servocontrol circuit 14 is supplied with the focus error signal and drives the focus coil 15 in response to the focus error signal. The tracking servocontrol circuit 17 is supplied with the tracking error signal and drives the tracking coil 18 in response to the tracking error signal. The tracking error signal is also supplied to the low pass filter 19 and the low frequency component of the tracking error signal is derived from the low pass filter 19 to be supplied to the pickup drive servocontrol circuit 20. The pickup drive servocontrol circuit 20 controls the rotation of the motor 21 for driving the optical pickup device in response to the low frequency component of the tracking error signal so as to shift the optical stylus to trace properly the spiral track of the disc.

As for such control for the motor 21 for driving the optical pickup device as aforesaid, in the above mentioned abnormal situation, since the reproduced signal from the disc is not properly obtained, the tracking error signal is not properly obtained also. Accordingly, the output of the low pass filter 19 becomes wrong and therefore the rotation of the motor 21 for driving the optical pickup device is not controlled properly. However, in the embodiment, when such an abnormal situation occurs, the switch $S_3$ is turned off so as to stop the motor 21 from rotating or the motor 21 is controlled to return the optical pickup device to its initial position for reading the signal from the disc, as described above, and consequently the motor 21 is also prevented from running away.

Although the motor for rotating the disc is stopped rotating when the abnormal situation, wherein reproducing of the signal from the disc is not conducted because the optical pickup device on the disc is positioned on the portion having the mirror surface, for example, is detected, it is also possible to control the motor for rotating the disc so as to rotate at predetermined appropriate rotating speed when the abnormal situation is detected.

What is claimed is:

1. A disc player for reproducing an information signal digitally modulated in the form of a run length limited code, having predetermined maximum and minimum run time lengths, recorded with constant recording density in a spiral track on a disc, said disc player comprising:

driving means for rotating said disc;

pickup means for scanning said spiral track on said rotating disc and reproducing the signal recorded therein;

first detecting means receiving the reproduced signal from said pickup means for detecting a first time interval of constant signal level representing one of said maximum and minimum run time lengths and providing a drive control signal having a level varying in response to the detected length of said first interval;

means connected to said driving means and receiving said drive control signal for changing an operating mode of said drive means, whereby said driving means is operated to maintain a predetermined constant length of said first time interval corresponding to a selected scanning speed of said pickup means relative to said disc;

second detecting means receiving said reproduced signal from said pickup means for detecting when a second time interval of constant signal level in said reproduced signal exceeds a predetermined maximum time interval representing said maximum run time length at said selected scanning speed and providing an overspeed control signal in response thereto; and controller means response to said overspeed control signal for producing a mode signal fed to said means for changing an operating mode of said drive means, whereby the operating mode of said driving means is changed.

2. A disc player according to claim 1, wherein said second detecting means includes envelope detecting means for detecting an envelope of said reproduced signal and comparing means for comparing an output of said envelope detecting means with a reference voltage, thereby producing said overspeed control signal.

3. A disc player according to claim 2, wherein said controller means responsive to said overspeed control signal causes said means for changing an operating mode of said driving means to stop the disc from rotating when said second interval exceeds said maximum interval.

4. A disc player according to claim 3, wherein said disc player further includes auxiliary driving means for driving said pickup means, said controller means responsive to said overspeed control signal producing a pickup control signal for controlling said auxiliary driving means to prevent said pickup means from moving relative to the disc when said second interval exceeds said maximum interval.

5. A disc player according to claim 1, wherein said disc player further comprises auxiliary driving means for driving said pickup means; and said controller means controls said auxiliary driving means for said pickup means to change its driving mode for driving said pickup means when said second interval exceeds said maximum interval.

6. A disc player according to claim 1, wherein said means responsive to said second control signal causes said driving means to rotate said disc in a reverse direction when said second interval exceeds said maximum interval.

* * * * *